US010866429B2

(12) United States Patent
Sharp et al.

(10) Patent No.: US 10,866,429 B2
(45) Date of Patent: Dec. 15, 2020

(54) TUNABLE COLOR ENHANCEMENT FILTER

(71) Applicants: Gary D. Sharp, Boulder, CO (US); Anthony D. McGettigan, Santa Rosa, CA (US)

(72) Inventors: Gary D. Sharp, Boulder, CO (US); Anthony D. McGettigan, Santa Rosa, CA (US)

(73) Assignee: Gary Sharp Innovations, LLC, Boulder, CO (US)

( * ) Notice: Subject to any disclaimer, the term of this patent is extended or adjusted under 35 U.S.C. 154(b) by 198 days.

(21) Appl. No.: 15/879,043

(22) Filed: Jan. 24, 2018

(65) Prior Publication Data

US 2018/0210223 A1    Jul. 26, 2018

Related U.S. Application Data

(60) Provisional application No. 62/449,949, filed on Jan. 24, 2017.

(51) Int. Cl.
*G02B 27/28* (2006.01)
*H04N 5/225* (2006.01)
*G02B 7/00* (2006.01)

(52) U.S. Cl.
CPC .......... *G02B 27/288* (2013.01); *G02B 7/006* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 4,416,514 A | * | 11/1983 | Plummer | G02F 1/13473 349/80 |
| 4,838,655 A | * | 6/1989 | Hunahata | G02F 1/13473 349/5 |
| 6,091,462 A | * | 7/2000 | Sharp | G02F 1/13473 349/19 |
| 9,933,636 B2 | * | 4/2018 | Sharp | G02C 7/104 |

(Continued)

OTHER PUBLICATIONS

International Search Report for International Application No. PCT/US2018/015041, dated May 4, 2018.

*Primary Examiner* — Derek S. Chapel
(74) *Attorney, Agent, or Firm* — Robert G. Crouch

(57) ABSTRACT

Single-stage polarization interference filters (PIFs) which produce sinusoidal transmission spectra useful for (Red, Green, Blue) color enhancement (CE). The depth of the CE effect can be modulated by rotating a polarizer. Further, a color suppression (CS) (Cyan/Yellow) state is obtained by rotating a polarizer to the orthogonal state, and a spectrally flat neutral state is obtained at an intermediate polarizer orientation. Described are CE filters that are very stable in transmitted lumens and white-point during tuning, which can, for example, substantially eliminate the need for image post-processing. Tunable CE filters can be used for sensors, image capture, display, tunable light sources, augmented reality, virtual reality, and sunglass eyewear applications. Further described are camera filters with a unique two-step tuning mechanism, which allows photographers to make independent adjustments to functional filter characteristics using a single hand in a sequential manner.

14 Claims, 8 Drawing Sheets

(56) References Cited

U.S. PATENT DOCUMENTS

| | | |
|---|---|---|
| 10,642,056 B2 * | 5/2020 | Dumpelmann ....... G01J 3/0256 |
| 2002/0196541 A1 | 12/2002 | Cai |
| 2007/0024779 A1 | 2/2007 | Sharp |
| 2009/0284708 A1 | 11/2009 | Abdulhalim |
| 2016/0033328 A1 | 2/2016 | Walters |
| 2016/0123811 A1 | 5/2016 | Hegyi et al. |

* cited by examiner

TUNABLE COLOR ENHANCEMENT FILTER

CROSS-REFERENCE TO RELATED APPLICATIONS

This application claims the benefit of U.S. Provisional Application No. 62/449,949, filed Jan. 24, 2017, the content of which is incorporated herein by reference in its entirety.

BACKGROUND

It is well documented that humans have a preference for more colorful images than they observe in the natural world (e.g. memory color). As such, one of the common adjustments to a captured image is to "punch up" the color/chroma. Many consumers would prefer to capture their perception of a beautiful image in the moment, with no requirement for post-processing. Many serious photographers would likewise prefer an interactive engagement with their environment and composition; to optimize results in the field, versus post-production manipulation of an input image that may be fundamentally flawed. The individual preference aspect of an optimized image, and artistic expression, call for a level of control in the field not currently available. Also, post-processing does not accommodate live events, (e.g. outdoor sporting events), where composition and lighting conditions can vary unpredictably, as can the desire to use on-the-fly filter tuning to optimize the result. Light filtered by moving clouds, for example, can introduce a temporal dependence of illuminance, degree of polarization, and color temperature.

It is against this background that the techniques described herein have been developed.

SUMMARY

Disclosed herein is a two-step tunable optical filter receptive of input light and which provides output light. The filter includes a first optically functional layer having a device normal and a second optically functional layer having a device normal, wherein the first optically functional layer receives the input light, and the second optically functional layer receives light from the first optically functional layer and provides the output light; and a first mechanical tuning mechanism and a second mechanical tuning mechanism, wherein the first mechanical tuning mechanism rotates the two optically functional layers about their device normals in unison, and wherein the second mechanical tuning mechanism rotates the second optically functional layer about the device normal with respect to the first optically functional layer.

The first and second optically functional layers may be polarizers. The first and second optically functional layers may each include linear polarizers. The first optically functional layer may include a linear polarizer, and the second optically functional layer may include a color enhancing polarization interference filter including one or more wavelength dispersive retarders and a linear polarizer. The first optically functional layer may include a linear polarizer, and the second optically functional layer may include a polarization interference filter including a quarter wave retarder followed by a linear polarizer for producing a filter with variable color temperature. The input light may come from an illuminated scene and the output light may be provided to an optical detection medium. The optical detection medium may be a camera sensor array. The optical detection medium may be a human eye. The input light may be light with a particular spectral power distribution and the detection medium may be a color sensitive detector. The filter may be affixed to a digital SLR camera and the tuning mechanisms may be rings. The filter may be affixed to a digital camera and the tuning mechanisms may be rings.

Also disclosed is a variable color enhancement filter that includes an input linear polarizer; one or more retarders; and an output linear polarizer positioned so that light passing through the input polarizer and the one or more retarders passes through the output polarizer, wherein the output polarizer is rotatable relative to the input polarizer. The transmission spectrum generated when the output polarizer is in one rotation orientation includes full color enhancement (CE), with peaks in the red, green, and blue wavelengths, and minima in the cyan and yellow wavelengths of maximum modulation depth. Rotation of the output polarizer by $\pm\pi/4$ with respect to the one rotation orientation for full color enhancement gives a neutral transmission spectrum. Rotation of the output polarizer by $\pm\pi/2$ with respect to the one rotation orientation for full color enhancement gives full color suppression (CS), with peaks in the cyan and yellow wavelengths and minima in the red, green and blue wavelengths of maximum modulation depth.

The filtered color coordinate for a spectrally flat input in the CE, CS, and neutral states may be substantially the same. Substantially the same may include the filtered color coordinate in each state being within a just noticeable difference. The filtered luminance for a spectrally flat input in the CE, CS, and neutral states may be substantially the same. Modulation of the output polarizer orientation may produce two or more distinct color filtered versions of an input image. Synchronous modulation of the output polarizer orientation with a field rate of an electronic image capture device may produce two or more filtered versions of an input for each captured field.

Also disclosed is a variable color enhancement filter that includes an input linear polarizer; one or more retarders; one or more liquid crystal polarization switches which change polarization state based on an applied voltage state; and an output linear polarizer. The liquid crystal may switch in combination with the output linear polarizer function substantially as a rotatable polarizer, wherein the transmission spectrum generated when the liquid crystal switches are in a first voltage state may include full color enhancement (CE), with peaks in the red, green, and blue wavelengths, and minima in the cyan and yellow wavelengths with maximum modulation depth, and wherein the transmission spectrum generated when the liquid crystal switches are in a second voltage state includes one of a neutral state which is substantially featureless in the visible, or full color suppression (CS), with peaks in the cyan and yellow wavelengths, and minima in the red, green and blue wavelengths with maximum modulation depth.

The liquid crystal switches may be achromatic and have a wide-acceptance angle. The liquid crystal switch may provide zero retardation in a first state and an achromatic half-wave retardation in a second state, with optic axis orientation selected to provide a polarization rotation of $\pm\pi/4$ or $\pm\pi/2$.

Also disclosed is a variable color temperature filter that includes an input linear polarizer; a chromatic quarter-wave (QW) retarder; and a rotatable output polarizer. A center wavelength of the QW retarder may be selected as a pivot point of the spectral tuning, wherein selection of a first output polarizer orientation gives a transmission spectrum with maximum value in the red wavelengths and a minimum value in the blue wavelengths, maximally reducing the color temperature of the transmitted spectrum, wherein rotation of the output polarizer by ±π/4 with respect to the first output polarizer orientation gives a substantially neutral transmission spectrum, wherein rotation of the output polarizer ±π/2 with respect to the first output polarizer orientation gives a transmission spectrum with maximum value in the blue wavelengths and a minimum value in the red wavelengths, maximally increasing the color temperature of the transmitted spectrum, and wherein rotation of the output polarizer gives substantially no change in the transmission of the center wavelength that was selected as the pivot point.

A positive c-plate retarder with a retardation of 50-100 nm may be placed between the polarizers, to increase angular uniformity. The QW center wavelength may be 570-590 nm. The color temperature for a flat input spectrum may shift substantially along the blackbody curve from approximately 3,400K to approximately 9,000K.

As described in co-pending U.S. patent application Ser. No. 15/331,245, the entire contents of which are incorporated herein by reference, sinusoidal Polarization Interference Filters (PIFs) are useful for color enhancement. An engineered sinusoidal spectrum can provide notches in the spectral cyan and spectral yellow, as needed to increase image colorfulness. With proper selection of retardation, the white-point shift can be held below a just noticeable difference (JND). As used herein, a JND refers to the amount something must be changed in order for a difference to be noticeable (i.e., detectable at least half the time). The term is commonly used is psychophysics, a branch of psychology focused on sense, sensation, and perception. Moreover, structures that use split-retarders with (e.g.) central achromatic rotators can provide a very stable transmission spectrum over a large field-of-view (FOV). Optically filtered images can often enable a result that is impractical and even impossible with post-processing. An active filter can also address changes in lighting conditions and input media on-the-fly, optimizing color output with a simple component rotation. PIFs for color enhancement use multi-order retardation to achieve the necessary wavelength dispersion. When the composite retardation is full-wave (half-wave) at a particular wavelength, a transmission maximum (minimum) occurs when the polarizers are parallel. When it is half-wave (full-wave) at a particular wavelength, a transmission maximum (minimum) occurs when the polarizers are crossed. The net retardation must be sufficient to generate maxima near the blue, green, and red bands in order for a color balanced output to be produced. This could either be three discrete peaks in each of the RGB primaries, or it could be two peaks, centered in the spectral cyan and spectral yellow.

The central portion of the human retina contains cones with three distinct photo-pigments, having transmission peaks centered in three regions of the visible spectrum (often termed short (S), medium (M) and long (L)). Early visual processing produces difference signals, or opponent signals; the (M−L) signal provides the amount of greenness, versus redness, and the (S−(M+L)) signal determines the amount of blueness versus yellowness. When a filter suppresses transmission in the spectral cyan and spectral yellow, the opponent signal places greater emphasis on the relative quantity of spectral blue, green and red in determining the perceived color. This transmission spectrum represents a color enhancement mode. Conversely, filtering out spectral red, green, and blue tends to weaken the impact of input spectral content on the opponent signals, creating a color suppression (CS) mode. The latter can be used to produce images with a more subdued appearance, as may be desired (e.g.) to capture a particular mood in an image.

Unity modulation-depth in PIF transmission occurs (e.g., (max−min)/(max+min)) when the retarder is oriented at ±π/4 with respect to bounding parallel/crossed neutral polarizers. This can be made to correspond to the maximum CE effect on an input. When one polarizer is rotated relative to the other two components the depth of modulation is reduced, as is the strength of the CE effect. At a critical angle the modulation can be eliminated, preserving the color fidelity of the input regardless of hue/chroma. Beyond this angle, the modulation of the inverse transmission spectrum increases. Ultimately, the modulation depth of the inverse spectrum is again unity, completing the full cycle. This corresponds (e.g.) to maximum color suppression on an input. That is, the transmission of green and red is lowest relative to yellow. At least one embodiment includes a user-selected level of CE on an input via (effective) angle tuning. The techniques taught herein can substantially preserve the stability of white point for neutral inputs during this angle tuning range, while modifying the hue/chroma of many non-neutral inputs. The techniques taught herein can also substantially preserve the stability of lightness/brightness of neutral inputs during this angle tuning range, while modifying the hue/chroma of many non-neutral inputs.

In the disclosed embodiments, manual/electro-optical/electro-mechanical angle tuning can be used in conjunction with visual observation or electronic capture of inputs to improve the perceived quality and/or improve upon the information content (e.g. color contrast). In one embodiment, the user selects the optimum angle while assessing the filtered input. In another embodiment, synchronous or asynchronous angle tuning occurs in conjunction with observation/capture of filtered inputs. This can create a time-sequence of outputs with various degrees of CE. In another embodiment, tuning occurs during capture of a still or video image frame, giving more information content from each field. In another embodiment, simultaneous observation/capture of filtered inputs can be accomplished using pixels with various degrees of CE. For this, a spatial distribution of polarizer (or half-wave retarder) angles is provided to give a temporally stable image with a range of CE levels. In some embodiments, the spatial dependence is used to uniformly sample the input spatially at difference CE levels. In others, spatially dependent CE can be used in, for example, a gradient fashion to highlight certain regions of an input, much like other gradient filters used in photography. Split-path configurations are also possible that allow simultaneous observation/capture of filtered inputs associated with orthogonal polarizations, via a polarizing beam-splitter (PBS), for example.

Any of the steps, features, or alternatives mentioned herein could be combined in any combination with any of the methods described herein.

DETAILED DESCRIPTION

Figure 1:
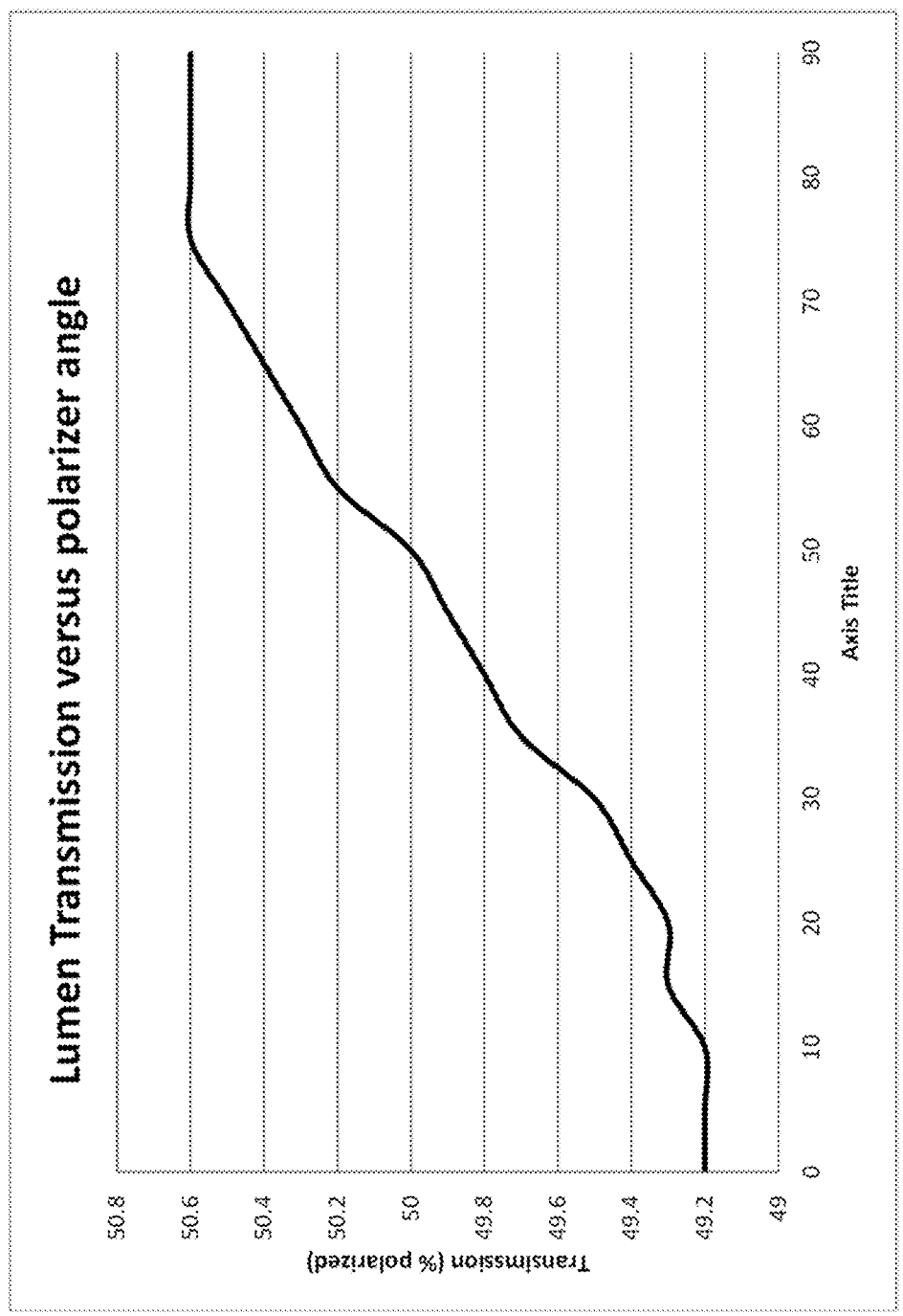
FIG. 1 shows an output of an exemplary CE/CS filter showing examples of filter spectra generated by select polarizer orientations.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The general transmission function of a single-stage PIF with optic axis oriented at $\pm\pi/4$ with respect to the first polarizer is given by $$T(\lambda,\theta) = \cos^2\theta \cos^2[\Gamma/2] + \sin^2\theta \sin^2[\Gamma/2] \quad (1)$$

where $\Gamma$ is the wavelength dependent retardation, and $\theta$ is the orientation of the second polarizer. The output is therefore the weighted sum of anti-phase terms, with relative weighting determined by the second polarizer angle. Some specific important cases are given by $$T(\lambda) = \begin{cases} \cos^2[\Gamma/2] & \theta = 0 \\ 1/2 & \theta = \pi/4 \\ \sin^2[\Gamma/2] & \theta = \pi/2 \end{cases} \quad (2)$$

A neutral 50% transmission function exists when the weighting is balanced (i.e. when one polarizer is rotated to $\pm\pi/4$). In this orientation the polarizer is parallel/perpendicular to the (compound) optic axis, so only a single wave is generated by the retarder. When the polarizer is rotated in either direction relative to this, the depth of modulation is increased. According to at least one embodiment, one direction of rotation produces a sinusoid that peaks in the three (RGB) primary bands, enhancing chroma/saturation. The minima lie at least in the spectral cyan and the spectral yellow. The opposite direction of rotation produces an anti-phase sinusoid, so peaks lie in the spectral cyan and the spectral yellow. Because red and green are partially attenuated with this rotation, so too is the strength of the red/green opponent signal. This has the effect of suppressing chroma. It should be understood that, as used herein, rotation of an optical component (e.g., a linear polarizer) refers to rotation about an axis normal to the optical component (i.e., rotation about the device normal).

Consider a single-stage PIF with parallel polarizers illuminated by a light source with a flat spectral power distribution (SPD). The polarizers are taken to be ideal, meaning that the transmission parallel to the absorption axis is zero, and the transmission perpendicular to the absorption axis is unity at all wavelengths. Using a single polycarbonate retarder with 5-waves of retardation at 532 nm, the CIE 1931 chromaticity coordinates associated with the sinusoid are given by $$(x_1, y_1) = (0.334, 0.332) \quad (3)$$

which is virtually the equal-energy white point $(x_0, y_0) = (\frac{1}{3}, \frac{1}{3})$. The transmission maxima occur approximately at 420 nm, 466 nm, 532 nm, and 636 nm. The transmission minima occur approximately at 403 nm, 441 nm, 496 nm, and 578 nm. Examples of spectra generated by this design are shown in FIG. 1 when the polarizer is rotated to specific angles.

Rotating the polarizer to the extreme position $\theta=\pi/2$, gives the inverse spectrum. Because $\sin^2\Gamma/2 = (1-\cos^2\Gamma/2)$, the crossed-polarizer color is related to the equal-energy white and the parallel-polarizer white by $$X_2 = (X_0 - X_1) \quad Y_2 = (Y_0 - Y_1) \quad Z_2 = (Z_0 - Z_1) \quad (4)$$

where, $$X_0 = \int \bar{x} d\lambda \quad Y_0 = \int \bar{y} d\lambda \quad Z_0 = \int \bar{z} d\lambda \quad (5)$$

and, $$X_1 = \int \bar{x} \cos^2 \frac{\Gamma}{2} d\lambda \quad (6)$$

$$Y_1 = \int \bar{y} \cos^2 \frac{\Gamma}{2} d\lambda$$

$$Z_1 = \int \bar{z} \cos^2 \frac{\Gamma}{2} d\lambda$$

In the above equations, $\bar{x}$, $\bar{y}$, and $\bar{z}$ are the CIE 1931 color matching functions, with the color coordinates given by $$(x_i, y_i) = \left( \frac{X_i}{X_i + Y_i + Z_i}, \frac{Y_i}{X_i + Y_i + Z_i} \right) \quad (7)$$

The above shows that if the parallel polarizer color coordinates lie on the equal-energy white point, so too must the color coordinates for the crossed-polarizer white point, or $$(x_2, y_2) = (\frac{1}{3}, \frac{1}{3}) \quad (8)$$

According to at least one embodiment, the three polarizer orientations discussed all lie virtually on the same white point, allowing it to remain stable as the color-enhancement effect is independently tuned. This lends itself to stability of the white point in other orientations of the second polarizer. Computer modeling shows that the x-coordinate of the white point remains 0.334 for the entire range of angle tuning. The y-coordinate shifts from 0.332 (parallel polarizers) to 0.337 (crossed polarizers), giving a maximum excursion in white point of 0.005, which is roughly half of a JND.

Figure 2:
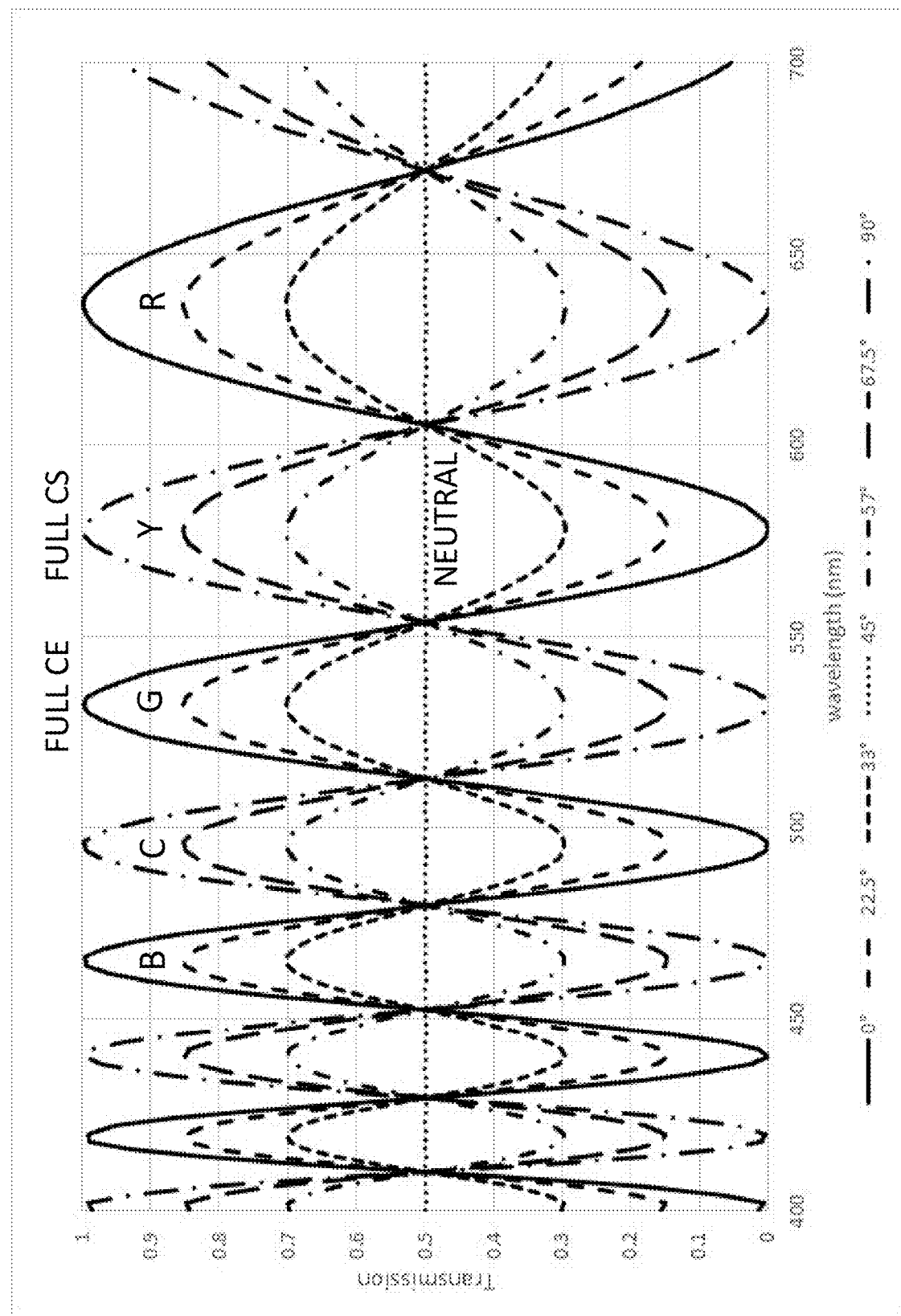
FIG. 2 shows computer model results of the change in transmitted lumens over a π/2 rotation of a polarizer in a tunable color-enhancement filter.

According to at least one embodiment, the lumen transmission is also stable under polarizer rotation. Based on an ideal polarizer, when one polarizer is rotated to $\theta=\pi/4$, the transmission is identically 50% (25% for an unpolarized input). For the example discussed previously, the model shows that the transmission for the parallel polarizer case is 49.2% and that for the crossed-polarizer case is 50.6%. The transmission for the full range of angles is shown in FIG. 2, where the maximum excursion is only 1.4%.

For visual applications, the polarizer can thus be rotated through the full range (from color suppression to full color enhancement), with no perceived shift in the lightness or color of neutral objects. To the extent that electronic sensors use scene context to perform automatic color balance (estimating the illuminant), very similar results should occur. This allows a user to select the desired level of color enhancement during capture and to immediately assess the image quality by observing the displayed image. Because the image is color balanced, photographers can achieve a desired image quality without necessarily resorting to image post-processing (e.g., PhotoShop®). Moreover, a suitable filter can modify the captured image in a way that is not easily duplicated in post processing. Such is the case when the filter preferentially attenuates scene elements on the basis of their state of polarization. For example, post-processing does not permit recovery of volume scatter (color) information from sub-surface scene elements when surface scatter dominates the signal. Moreover, intense surface scatter can create veiling glare (stray light that impacts other regions of an image), and consume dynamic range in a way that is not recoverable in post-processing. As a polarization-based component, the filter uniquely can enhance an image via both notch filtering and glare suppression, for example.

Glare (e.g., from water, ice, glass, and automotive paint) due to relatively directional scatter from surfaces can be highly polarized. Since polarized glare tends to be achromatic and intense, it can strongly suppress chroma associated with sub-surface (volume) scatter of colorful scene elements. In the absence of glare suppression, the effectiveness of the CE filter can therefore be lessened in many outdoor scene contexts. The clear sky can also have a high degree of polarization. The orientation of polarization (e.g., sunlight reflected from water or the sky) is highly dependent upon illumination and observation geometry. Photographers frequently use rotatable linear polarizers in landscape photography to create a desired level of contrast between scene elements (e.g., clouds and the sky), and/or to improve color. The above argues for a two-step orientation process for photographers interested in truly optimizing image quality, and/or expressing themselves creatively.

As discussed, certain structures disclosed herein include a pair of polarizers; one attached to a retarder (or compound wide-angle retarder), and one rotatable. Rotating the entire unit in unison allows preferential attenuation of polarized scene elements, while rotating just one polarizer allows CE level control. If a rotating linear polarizer is mounted on the input-side, then rotation couples the level of color enhancement with attenuation of polarized scene elements. A circular polarizer (quarter-wave retarder laminated on the input side of the input polarizer) effectively makes the input scene appear unpolarized, so polarizer rotation only changes CE level. Alternatively, a rotating polarizer can be mounted on the output side, so that the input polarizer is in a fixed orientation. This decouples CE control from the attenuation of polarized scene elements. In this case, the input polarizer can be placed in a fixed orientation relative to the sensor (e.g. like polarized sunglasses). Assuming that there is a desired orientation, a camera with a fixed polarizer could not in general capture images of the same quality in both landscape and portrait modes. According to a preferred embodiment, a (e.g.) gravity sensitive mechanism can be used to maintain the outer polarizer in a consistent orientation when the camera is rotated between landscape and portrait modes. This mechanism could be active or passive, such as a free-rotating mount with a weight attached to an arm extending from one side. However, this solution does not provide the level of control that many photographers seek.

The prior art for tunable camera filters, such as variable neutral density filters (VND), is a pair of linear polarizers mounted together with a rotation ring. This assembly is threaded onto the camera lens, giving another degree of rotational freedom. Gripping both polarizers with one hand allows them to be rotated in unison (preserving density while changing input polarization. However, it is not practical to preserve the input polarization while changing the density with one hand. This is simply because rotating the inner ring simultaneously rotates the outer ring. Similarly, there is no practical way to independently select the important parameters of input polarization filtering and CE filtering. The present invention describes mechanical configurations supporting a two-step process that in general allows selection of two functional filter parameters, sequentially, using a single free hand. Note that, while the invention is described in the context of a variable color enhancement (VCE) CE filter, it applies equally well to the even simpler VND filter structure. Further, it applies to any structure that includes a pair of optically functional layers that can be rotated relative to each other for one purpose and rotated in unison together for another purpose.

Given the level of control that an external linear polarizer can exert in both glare suppression (which can itself be a color enhancement mechanism), and independent selection of lightness/brightness of partially polarized scene elements, it can be beneficial to use the inventive two-step orientation scheme prior to image capture. This also overcomes issues arising from the 90° rotation associated with landscape and portrait modes. According to a preferred embodiment, the two elements of the filter are both mounted on a rotating hub. Rotating the hub allows the CE level to remain fixed while the outside (input) linear polarizer orientation is optimized. With the hub locked in the desired orientation, the user can then independently rotate the inside (output) polarizer to select the desired CE level. The retarder can be mounted on either the input or the output polarizers. If a user previously determined a desired level of CE to apply to all captured images, then the second step can be omitted. If a user wishes to optimize the CE level for a specific image, then this polarizer can be rotated while observing the scene on the display (viewfinder). In the event that it is difficult to clearly see the image (e.g. due to high ambient light level), the user can capture a video clip or operate the camera in burst-mode while rotating the polarizer and sweeping the range of CE levels. The desired image can then be selected later under better display conditions. Should it be useful to continuously capture image data sets with the full range of color enhancement, a polarizer can spin freely using (e.g.) a motor. A full rotation of the polarizer represents two cycles of the full color enhancement range, with four occurrences of zero color-enhancement One of the benefits of digital photography, relative to film, is the potential for "instant gratification" when capturing images. Images that fall-short of the objective can be immediately discarded at no cost and the process repeated (at least for stills). And the ability to adjust camera settings and insert various filters while in-the-field can in principle create an interaction and engagement with the environment that many artists feel is an essential aspect of their craft. For still digital photography artists can operate in a feedback mode; modifying the settings and filtration until the desired result is achieved. The purity of this organic process is appealing to many photographers, relative to manipulation of non-optimum images in post-production. A good example of this is (rare-earth) color intensifying (CI) filters, which can be used to increase the chroma. Prior art CI filters are not interactive because they have a fixed notch density (i.e. no adjustability) and they have a particular strong color cast that requires subsequent color-balancing. While most artists post-process their images to overcome issues such as this, the potential to eliminate this step is artistically compelling. The techniques disclosed herein allow any photographer to adjust filter settings so that the image color is customized to their satisfaction in the field. The techniques taught herein do not preclude post-processing if desired. As filters and image processing each have unique attributes, the post processing of a filtered image generally yields a different result. The complementary aspect of these can be another tool leveraged by the photographer.

Filters of the invention that are modulated in a periodic fashion are particularly useful for video applications, including consumer video cameras, professional broadcast cameras, and cinema cameras. One use for filter modulation is to provide an output image sequence that enables image enhancement in post-production. By spinning a neutral polarizer, the VCE filter sweeps through the full range, from full color enhancement to full color suppression. Table 1 shows select polarizer angles and the corresponding output over a full rotation of the analyzing polarizer, which contains two cycles of color enhancement, two cycles of color suppression, and four neutral states.

TABLE 1

Output spectrum versus polarizer angle over full rotation.

| Analyzing Polarizer Angle | Output |
| --- | --- |
| 0 | Full Color Enhancement |
| π/8 | Partial Color Enhancement |
| π/4 | Neutral |
| 3π/8 | Partial Color Suppression |
| π/2 | Full Color Suppression |
| 5π/8 | Partial Color Suppression |
| 3π/4 | Neutral |
| 7π/8 | Partial Color Enhancement |
| π | Full Color Enhancement |
| 9π/8 | Partial Color Enhancement |
| 5π/4 | Neutral |
| 11π/8 | Partial Color Suppression |
| 3π/2 | Full Color Suppression |
| 13π/8 | Partial Color Suppression |
| 7π/4 | Neutral |
| 15π/8 | Partial Color Enhancement |
| 2π | Full Color Enhancement |

Consider an example where a polarizer is rotated continuously in a VCE configuration, placed somewhere in the optical train between the input of the lens and the camera sensor. By rotating at half the frequency of the video capture, the sensor receives the full range of outputs at the field rate. Averaged over the field with a stationary input, the output is substantially equivalent to that without the filter. However, to the extent that the camera enables extraction of intra-field information, additional color information can be derived from time-resolving the information received by the sensor over the course of the field.

Mechanical polarizer rotation can be replaced by electro-mechanical or electro-optical switching mechanisms. Liquid crystal devices combined with fixed polarizers can replace a rotatable polarizer. The liquid crystal mode ideally functions as an achromatic rotator with voltage variable rotation angle. If a pure analog rotator of sufficient performance is not attainable with an LC mode, a binary LC device may be sufficient in some applications. For instance, persistence of vision can be useful for creating the appearance of analog CE by changing the duty cycle of a rapidly switched LC device. The LC device can switch between a neutral state and a full CE state, with the perceived CE level controlled by the duty ratio. A chromatic LC device (e.g. a birefringence mode device) could be used in a binary mode, provided that the required level of white-point stability and luminance is maintained in both states.

Analog achromatic LC rotators, as described in the prior art can be used. In the event that modulating between zero CE and full CE are desired (i.e. no color suppression), an analog π/4 range is required. The configuration could fix one polarizer angle relative to the other for any desired bias. This can be useful for balancing any chrominance associated with the modulator as it sweeps through the full range of rotations. Similarly, passive compensators (such as retarders) can be added to create a balance between the extreme voltages if the LC modulator is chromatic. It is important to note that the modulator must not function as a chromatic variable retarder (i.e. a birefringence-mode), since this does not behave as a rotatable polarizer. In order to sweep the range of CE, the electro-optic device must behave as a rotator. Field-of-view compensation of the LC device may be required in order to ensure adequate filter stability with incidence angle. The present invention can be used with analog modulators, multi-state modulators, and two-state polarization switches. Examples of analog devices include electromechanical rotating polarizers (e.g. physically circular polarizers that rotate about their center, and polarizers mounted to filter wheels with center displaced from the center of the optical path). Binary polarization switching with an analog rotating device can be implemented by using a fixed polarizer following an achromatic pure rotator (as described by, e.g., Sharp, U.S. Pat. No. 8,408,708). Also included are electro-optical (e.g. liquid crystal) devices that emulate a rotating polarizer. Due to the frequent need for wavelength and angle of incidence (AOI) insensitivity, it is often more straightforward to design LC devices that behave as binary polarization switches. In this case, multi-state switching can be accomplished by cascading one-bit LC switch stages proceeding a static polarizer.

It may be the case that only the extremes in output (i.e. full CE, full CS, and neutral) are important. In this case, a binary switch with three output states is required. This can be accomplished with a two-state switch that modulates between three polarization states (e.g. zero, and ±π/4 rotation). In the event that only full CE and neutral are required, or full CE and full CS, a one-bit switch is adequate.

Wide-angle wavelength independent switching devices are described in co-pending application (Sharp, U.S. Patent Application No. 62/588,095, entitled "Self-Compensating Liquid Crystal Retarder Switch"), the contents of which are hereby incorporated by reference. These devices in particular can provide (e.g.) a zero-retardation and a half-wave retardation state with the above independence. In the HW state, the switch can (effectively) rotate the polarization by π/4 or π/2. By combining such switches with the CE filters described, two or multi-state switching with high performance is possible. With such switches, specific states such as shown in Table 1 can be accessed rapidly and with no moving parts.

Hybrid color-capture architectures are described in the prior art that combine an imaging device containing a spatial mosaic filter (e.g. Bayer pattern) with a two-state color switch to enhance the quantity/quality of color information. The two-state filter may include a pair of filters with complementary transmission spectra (e.g. a periodic function that subdivides the RGB primaries). In this case, the product of the spatial filter array and two-state filter yields six spectral samples (e.g. pairs of blues, greens and reds). An alternative to this is to use the CE filter of the present invention. For example, in one state of the filter the full CE is transmitted (RGB peaks), and in the other state the full CS is transmitted (CY peaks). As described above, a two-state LC switch following a polarizer/retarder of the present invention can enable this. Unlike the six-color scheme of the prior art, the present approach uniquely enables two filter states with balanced white-point and lumen transmission and fundamentally complementary spectra. As discussed previously, a third neutral state is also possible by adding an additional switch state.

Simultaneous capture of enhanced color information as described previously can also be obtained by placing an array of micro-polarizers over a color/monochrome sensor, or by using separate paths for analyzing each polarization orientation. For the former, an array of micro polarizers oriented along 0 and $\pi/2$ allows simultaneous capture of the two extreme (CE/CS) spectra. A third micro-polarizer oriented along $\pi/4$ allows additional capture of a neutral state. Such devices can be implemented by placing a uniform CE filter in the optical train somewhere between the input of a camera lens and a sensor containing a micropolarizer array. The sensor has an array of patterned micropolarizers (e.g. wire-grid polarizers) in registration with the pixel sensors, so that each color sub-pixel samples the local state of polarization.

The present invention can apply both to discrete light sensors/receivers (single pixel devices to dense array devices), as well as light sources. Any visible light source spectral power distribution (SPD) can be actively modified using the above modulation techniques.

The techniques taught herein can be used external to an existing product, as an after-market attachment, or they can be integrated into the optical train of a product. It can also be integrated into other after-market products, such as detachable fixed/zoom lenses and camera cases (e.g., OtterBox®). Camera cases that accommodate after-market CE filter housings, or are integrated into camera cases are feasible. For the former, a cutout on the case around the camera aperture can allow the case to be installed after the filter is attached to the phone. A perforation can be used so that users can remove a panel when they install a CE filter. A camera case product carrying the CE filter can potentially better protect the filter and more securely attach it. Swapping between cases is an alternative to a filter slider, so a product could be a case with the CE filter permanently aligned over the camera aperture.

An application for the tunable CE filter is as an accessory for smart phones. The filter can either be semi-permanently attached over the camera module, or it can be on a slider (or the like) that allows the user to park it adjacent to the camera aperture when not needed. Cameras continue to become more sensitive, so in the event that a loss of two stops (25% transmission) is not an issue, the filter could potentially be permanently mounted above the camera. Or, given the low cost of mobile phone camera modules, it could be permanently attached to a dedicated camera in future products.

Figure 3:
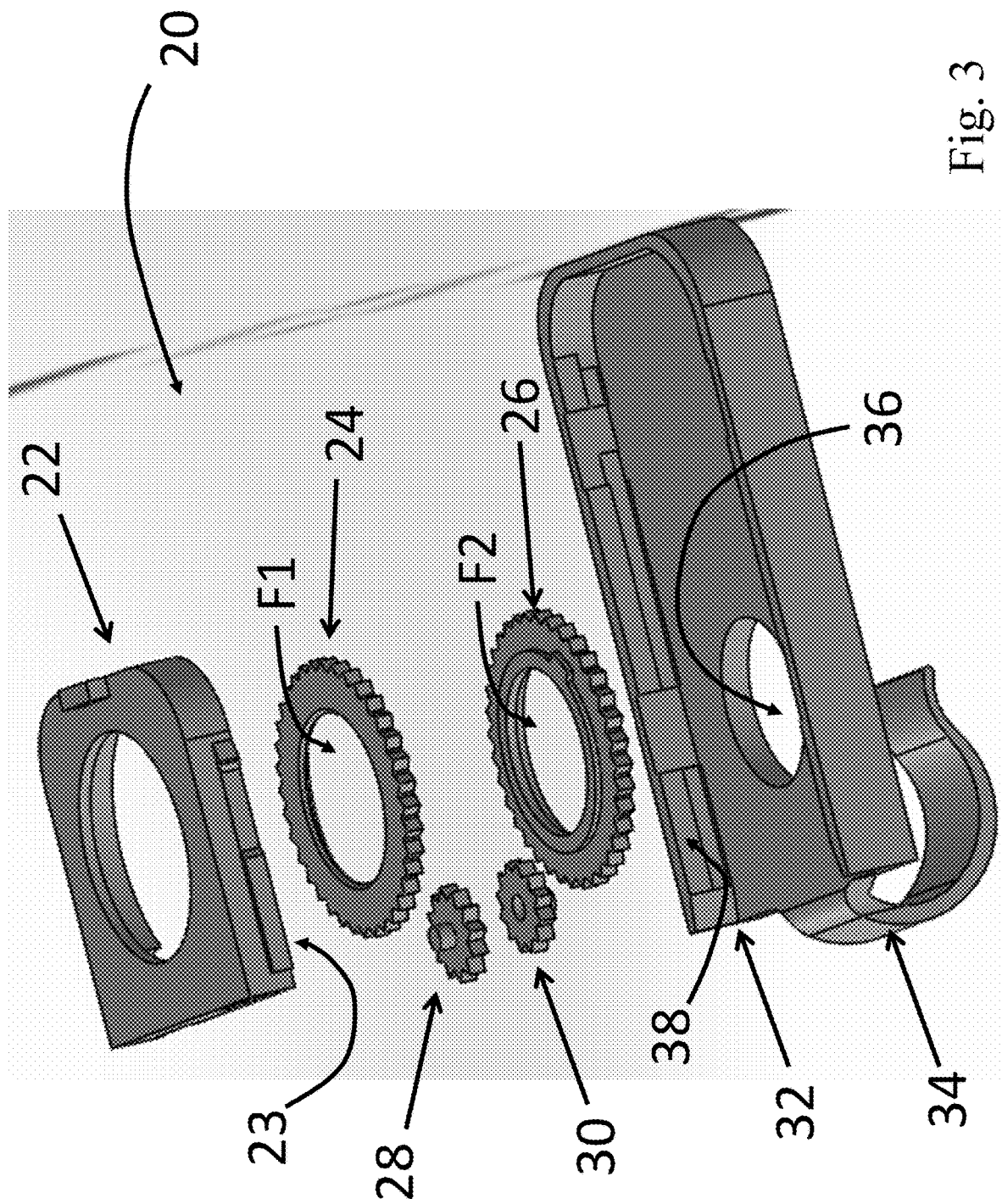
FIG. 3 is a blow-up of a preferred embodiment of a mobile phone clip-on tunable CE filter attachment.

One arrangement for an after-market product, shown in FIG. 3, is a mechanical slider with a potential attachment using the surface area of the base (which has a through-hole at the camera aperture). The fixture could allow swapping with other types of filters as needed while keeping the base attached. The attachment mechanism could be a cross-linked adhesive, a pressure-sensitive-adhesive (PSA), a magnet, or a mechanical mount. A mechanical attachment could be in various locations, also including a (e.g. metal) clip that wraps over the top of the phone to secure the housing. The filter optical parts can be mounted in pockets on manual rotation stages. The filters can be potted into the pockets with an adhesive, and/or mechanically held with a cover plate. One element of the rotation stage allows rotation of both filter elements in unison, to allow desired level of attenuation of partially polarized scene elements. The second element of the rotation stage allows rotation of just the second polarizer (or second polarizer and retarder), allowing independent selection of CE.

According to at least one embodiment, after-market products are low-profile, compact, and aren't prone to snagging on fabrics when the phone is inserted/removed from storage (e.g. pockets or cases). A low-profile clip that follows the contours of the phone (using e.g. stainless steel) and can provide a snug and reliable attachment of the product. This clip could be the only attachment mechanism, or it could be used in conjunction with (e.g.) a PSA attaching the base to the phone back. For ease of removal, this could be a low-tack reusable PSA, a high surface energy material (e.g. silicone) or a material that grips the phone when pressed (e.g. suction-based). The mount could additionally take advantage of phone features that are not flush with the phone back (e.g. the window that is above an I-phone surface), either to self-center a filter through-hole, to provide mechanical support for the clip, or both.

Control of the filter rotation stages can be done using a number of methods. Low-cost, simple, low profile mechanisms are preferred for mobile phone products. One method allows easy release/engagement of a clutch, followed by filter rotation while gripping a (e.g. smart) phone. For example, a lever or button can be actuated (e.g. squeezing between thumb and index finger) while holding a mobile phone, with rotation accomplished by sliding the finger while actuating. When released, the stage locks in the desired position, and the other stage can be independently rotated in a similar manner. A clutch is not specifically required for the second rotation, since the first is fixed, though some users may like for the CE level to remain in a fixed default position.

In one embodiment, turning a first wheel with the index finger while holding the phone rotates all filter elements in unison. This allows the user to select the desired level of attenuation of polarized scene elements with fixed color enhancement. Once the outer polarizer angle is selected, the user can pinch the wheel (and phone) between thumb and index finger, activating the clutch. When activated, the outer polarizer (input polarizer) is released, so that it remains in a fixed orientation during subsequent rotation. By sliding the index finger while continuing to pinch, the remaining elements (retarder/output polarizer) can be rotated relative to the input polarizer. This allows selection of the desired CE level.

The filter elements can rotate continuously, or they can have stops that identify key angles. The full filter unit need only have a full rotation range of $\pi/2$ to sweep the full range of outputs. With the outer polarizer (Filter 1, or F1) biased to an orientation of $\pi/4$ with respect to one edge of the phone, a clockwise rotation of $\pi/4$ can pass light polarized parallel to one edge of the phone, with a counter-clockwise rotation of $\pi/4$ passing light polarized parallel to the other edge of the phone. The stops enable simple angle identification when switching between landscape and portrait modes. Stops can also be used for selecting the CE level when rotating the second filter (Filter 2, or F2) relative to F1. F2 contains the retarder laminated to the second polarizer (though it could alternatively be laminated to F1). A full rotation range of $\pi/2$ is again required, in this case relative to the other polarizer versus the phone. Additionally, a "bump" (or detent) can be added so that a user can locate the zero-CE angle by feel during rotation. The bump preferably occurs when the output polarizer is oriented at ±π/4 with respect to the input polarizer. Rotation clockwise to one mechanical stop can produce maximum CE, and rotation counter-clockwise to the other mechanical stop can produce maximum CS.

A first aspect of preferred embodiments is mechanical designs that enable a two-step optimization of the filtered image, as described previously. Because F2 must rotate by π/2 with respect to F1, a rotation range of π is required for F2 in the camera reference frame. A second aspect thus includes designs that limit the total rotation of each filter element to π/2 (which can simplify the design). A third aspect includes designs that decouple filter angles from actuator locations, so that actuators are easily located by users regardless of settings. A fourth aspect includes designs that are easily tuned (by a single finger) while holding the phone with one hand. And a fifth aspect includes designs that are compact and low-profile. A design that embodies these attributes is shown in FIGS. 3 and 4.

FIG. 3 shows an exploded view of a preferred embodiment of a color enhancement filter 20. A filter body 22 has slider mechanism (including features 23 on sides thereof) and contains a protective (e.g. AR coated glass, not shown) window, so that the internal optics are protected from the environment. The outer gear wheel (GW) 24 and inner GW 26 have inner pockets for holding the outside filter (F1, e.g. linear polarizer), and inside filter (F2, e.g. linear polarizer and retarder), respectively. The GWs 24 and 26 are engaged by finger wheels 28 and 30. The filter body 22 snaps into the slider unit 32, which has a clip 34 for attaching to the phone and a through hole 36 that aligns to the camera window. The slider unit 32 has a channel 38 that engages with the features 23 on the side of the filter body 22 to allow for the two positions of the filter 20.

Figure 4:
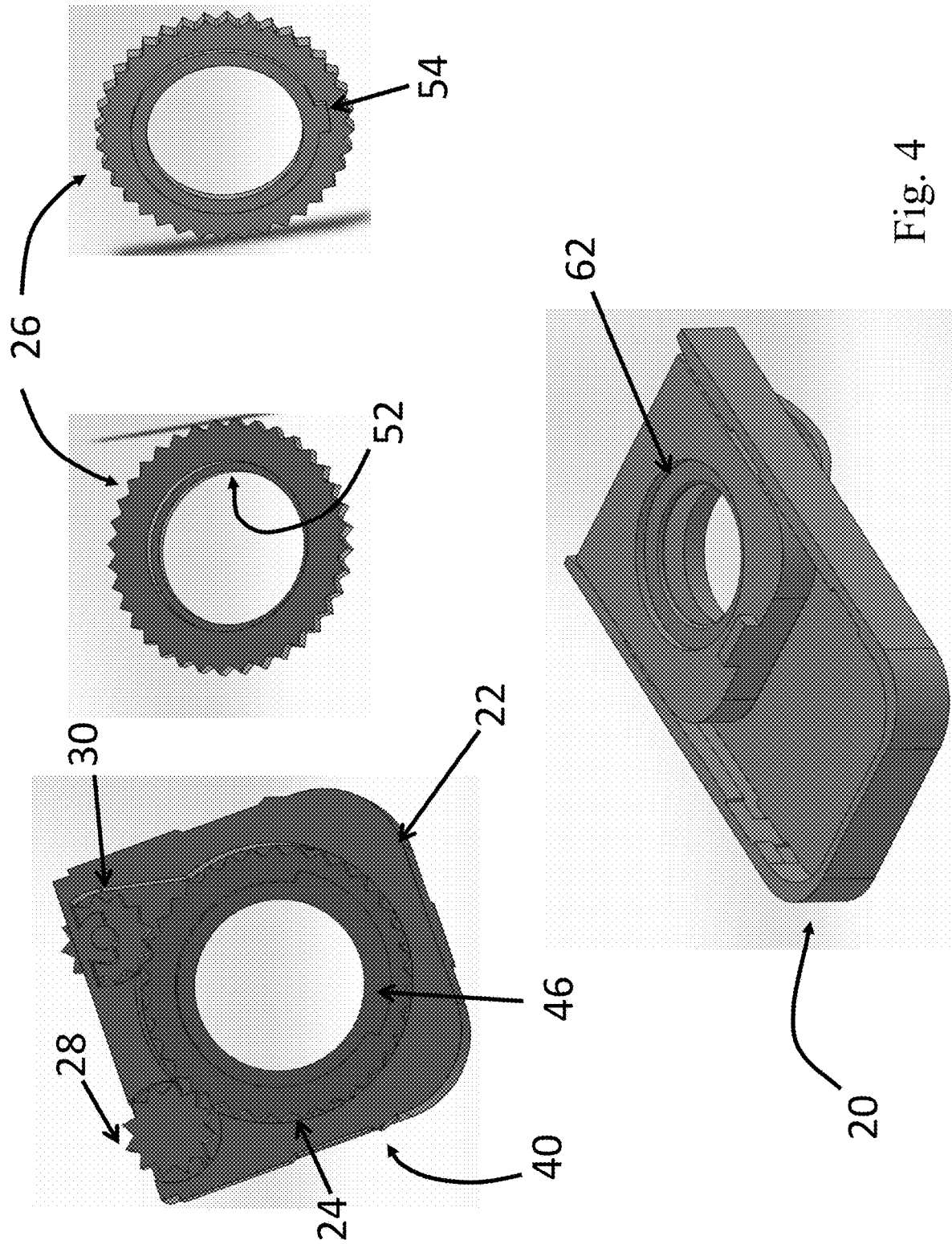
FIG. 4 shows sub-assemblies detailing aspects of FIG. 2 components.

FIG. 4 shows a partial assembly 40 of the components of the filter 20 of FIG. 3. This shows the underside of the filter body 22, which has a pocket that receives the outer GW 24. The inner GW 26 is received in a pocket 46 of the outer GW 24. The inner GW 24 has a pocket 52 for receiving and retaining the filter F2. The shoulder features within pocket 46 of the outer GW 24 engage the feature 54 on inner GW 26 to limit the range of rotation to π/2. When the finger wheel 30 is rotated, outer and inner GWs 24 and 26 rotate in unison. The other finger wheel 28 is used to independently rotate GW 26 to select the desired CE level. The fully assembled unit 20 has a protective window 62, shown with the filter in the engaged position of the slider.

Figure 5:
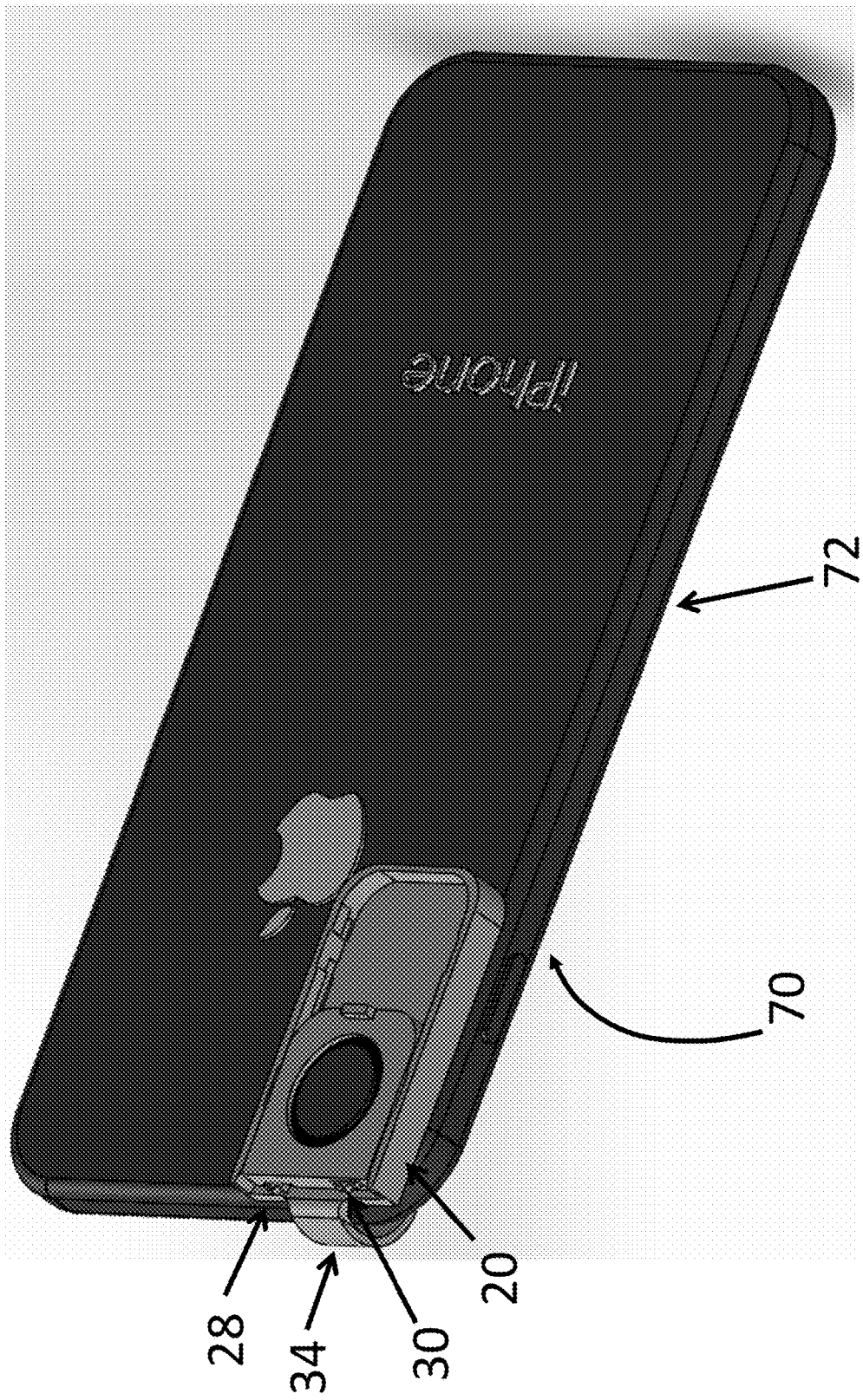
FIG. 5 shows a tunable CE filter clipped onto a back of a mobile phone.

The filter body 22 can have guide features 23 on two sides, which can be inserted into channels 38 or slots on either side of the slider unit 32. The slider unit 32 thus attaches the filter body 20 to the phone. As FIG. 5 shows, the filter body can be translated in the channel to either extend over the camera aperture, or retract away from the camera aperture. The channels can be oriented such that the slider axis is parallel to either the long or short edge of the phone. FIG. 5 shows an arrangement 70 with a mobile phone 72 with the filter unit 20 attached with clip 34. With the filter engaged (slid upward in FIG. 5 so that the aperture aligns with the camera aperture), the FWs 28 and 30 are easily accessed along the short edge of the phone. The entire base (minus the through hole) can be used as a pad for attaching the filter unit 20 to the phone 72.

Figure 6:
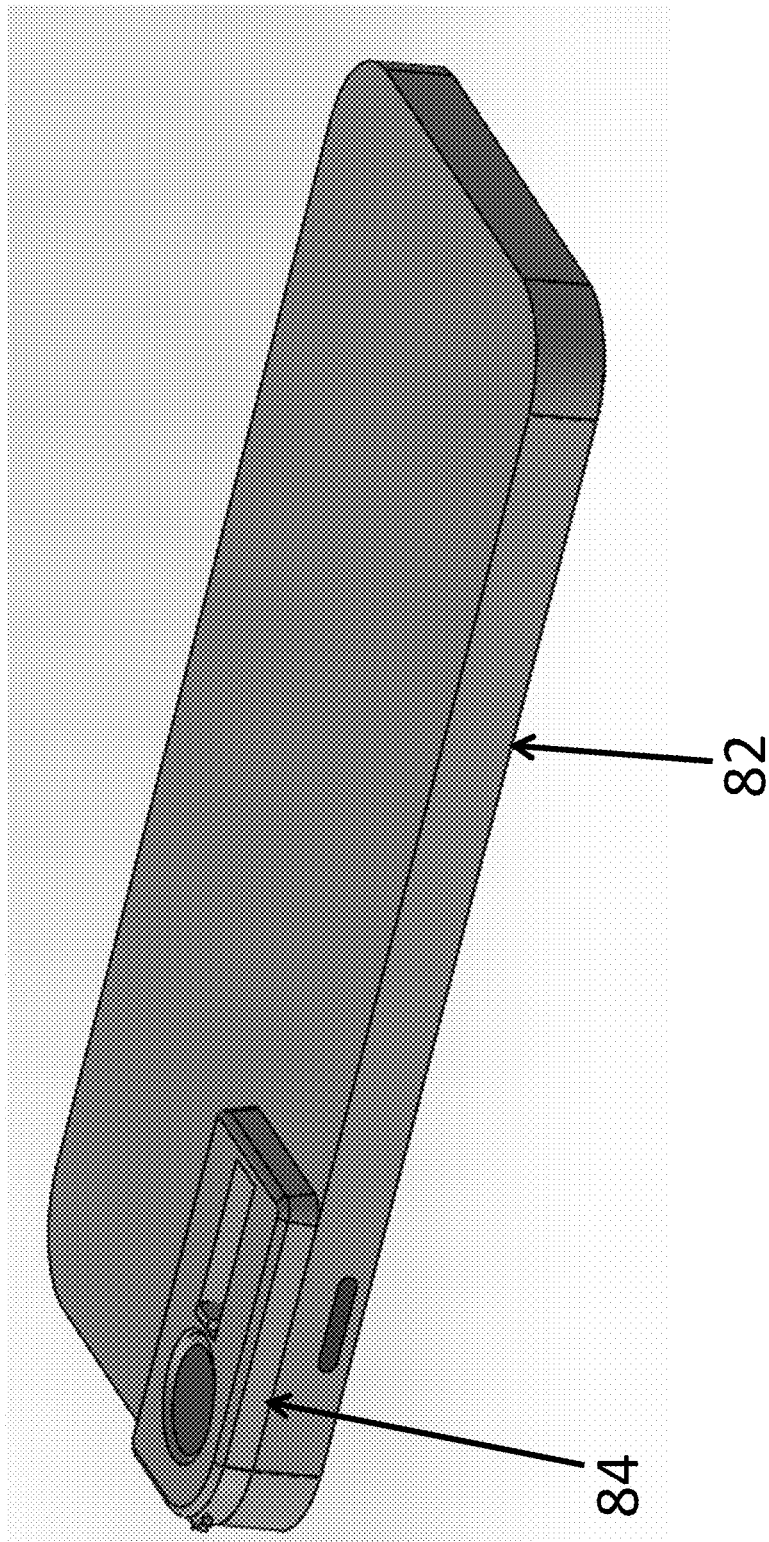
FIG. 6 shows a tunable CE filter built into a mobile phone camera case.

FIG. 6 shows a camera case 82 with a similar filter unit 84 built into it. The case 82 could either have a two-position slider, or have the filter in a fixed position over the camera module.

Digital SLR cameras typically use rotatable rings to house filters, which are threaded onto the camera lens assembly. Rings are threaded on both sides, so that several rotatable filter mounts can be ganged together. Standard rotation rings do not support the two-step angle optimization well. Consider the case where the input polarizer is mounted in a rotatable ring, and the retarder and output polarizer are both mounted in a second rotatable ring. By holding both rings, a user can rotate the entire filter in unison, preserving the CE setting. But this does not enable independent rotation of the second ring. Mechanical fixtures are anticipated for DSLRs that accommodate a two-step optimization, as needed for CE filters and more generally (e.g. variable attenuators). Mechanical configurations enable a user to hold an instrument (e.g. camera) in one hand, while performing the two step rotation to optimize the input with the other hand.

Figure 7:
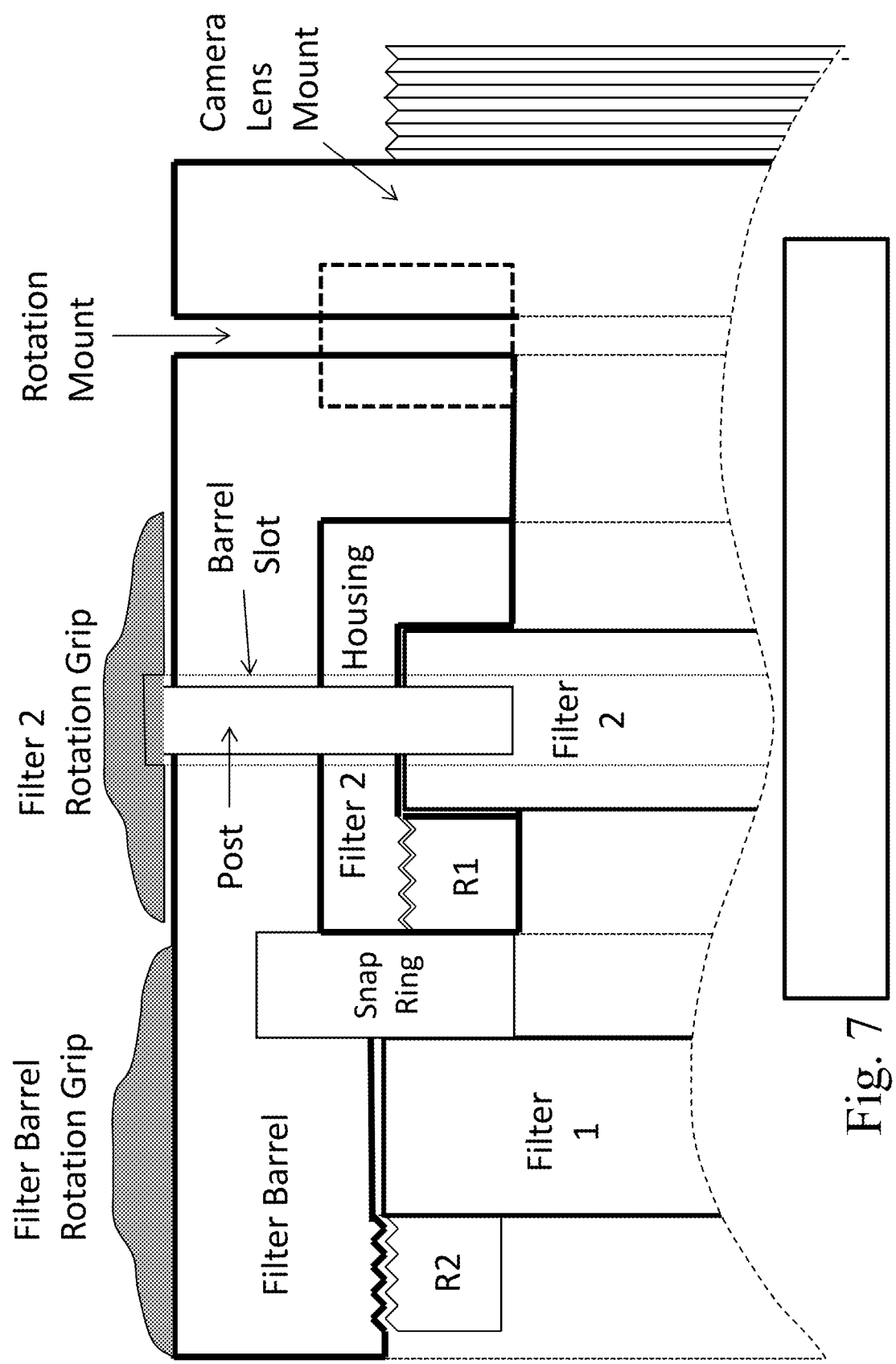
FIG. 7 shows a cross-section of a tunable CE filter for a digital SLR camera.

FIG. 7 shows the cross-section of a mechanical arrangement for a two-step angle optimization. The camera lens mount threads onto standard lens housings. The filter rotation barrel grip is used to manually rotate the filter barrel (FB) with respect to the camera lens mount. This can support a full 2π rotation, or it can have stops to identify key angles (minimum of π/2 required). When the filter barrel is rotated, all filter elements rotate in unison. This enables selection of input polarizer angle (Filter 1, or F1) with fixed CE level. The retarder and output polarizer are inserted into the Filter 2 (F2) housing (retarder facing F1). A retaining ring (R1) holds the optical part in the F2 housing in a fixed orientation. The F2 housing is initially placed into the FB. The FB is slotted, with one or more slots of π/2 extent. The F2 housing is threaded, and a post extending above the FB is inserted through the slot into the F2 housing. A snap ring is inserted that secures the F2 housing, while allowing it to rotate with respect to the FB. F1 is then inserted into the FB, and a second retaining ring (R2) secures F1 to the snap ring. A second grip engages the post (preferably wrapping the entire FB for easy access), allowing F2 to be manually rotated with respect to the FB. The rotational resistance of the latter is low relative to the FB rotation resistance, securing the FB as the F2 housing is rotated. This arrangement could be applied to other filters as well. For example, F1 and F2 could be a pair of linear polarizers (ideally with a field of view compensation to provide incidence-angle uniform transmission). Rotating the FB selects transmitted polarization, and rotation of F2 allows independent selection of attenuation.

In practice, the filter has chromatic polarizer angle-independent losses that represent a spectral envelope function. This tends to be dominated by the transmission profile of the pair of "neutral" polarizers. The envelope function can shift the white point, much the same as a change in the color temperature of the illuminant. The vision system chromatic-correction, or auto color-correction in a camera can compensate for reasonable shifts in white point. Mathematically, the previous analysis can be generalized to apply to arbitrary transmission spectra with a wavelength dependent envelope function. The envelope function does not change the relationships between the color coordinates. The inverse spectral relationship of parallel and crossed polarizer transmission, and the requirement that the filter produce matched white points in one state, forces the white point in the orthogonal polarization to be matched.

Mathematically, if the filter has transmission function $$T_0(\lambda) = \kappa(\Delta) T(\lambda, \theta_0) \qquad (9)$$

Where $\kappa(\lambda)$ is an arbitrary envelope function, and $T(\lambda, \theta_0)$ is the transmission function of Equation 1 for polarizer angle $\theta_0$, then rotation of the polarizer by $\pi/2$ gives the transmission function $$T_1(\lambda)=\kappa(\lambda)T(\lambda,\theta_0+\pi/2)=\kappa(\lambda)(1-T(\lambda,\theta_0))=\kappa(\lambda)-T_0(\lambda) \quad (10)$$

And therefore the previous relationship between color coordinates persists. A typical envelope function has weak wavelength dependence, and can be corrected just as shifts due to change in the illuminant color temperature. Unlike the illuminant, the envelope function is easily measured and is independent of the scene.

The impact of the sinusoid on the color coordinate is also dependent upon the spectral power distribution (SPD) of the illuminant. The above can be recast in terms of relationships between SPDs versus transmission functions, with the same end result. Say that the product of filter envelope function and SPD represents a particular color coordinate $(x_0, y_0)$, and that the product of filter envelope function and SPD modulated by the filter transmission function in State 1 produces another color coordinate $(x_1, y_1)$. Further, the product of filter envelope function and SPD, modulated by the filter transmission function in State 2 (one polarizer rotated by $\pi/2$) generates a color coordinate $(x_2, y_2)$. If the filter is designed around the SPD, such that $(x_0, y_0) \approx (x_1, y_1)$, it in general follows that $(x_0, y_0) \approx (x_2, y_2)$. As discussed previously, when these conditions are satisfied, the color coordinates remain stable as the polarizer is rotated in an analog fashion.

While the filter envelope function tends to be a slowly varying function of wavelength, and tends not to be variable (for reasonable component tolerances), the characteristics of the illuminant SPD can be highly variable. Changes in the input SPD can thus erode the optimized performance. A relevant example includes a change in the solar color temperature, which again tends to be a slowly varying function of wavelength. Another relevant example is a more structured SPD, which places much greater emphasis on the weighting of specific wavelengths. Examples of the latter include multi-wavelength LED clusters, and fluorescent light sources. The CE filter likewise places high weighting on specific wavelengths to achieve the desired color balance. In a simplistic way, the filter can be considered to sample the continuous spectrum at specific wavelengths. If the SPD color-temperature changes (e.g. a spectral ramp), then the color coordinate must shift. However, to the extent that the weighting of the spectral sampling is representative of the continuous spectrum, then the color coordinates will substantially track each other. In other words, $(x_0, y_0) \approx (x_1, y_1)$ remains valid to first order.

Consider the first example, where a sinusoid was selected that virtually produces the equal-energy white based on a flat input SPD. If the illuminant spectrum is changed to a linear ramp with (e.g.) 22.5% at 400 nm and 97.5% at 700 nm (0.025%/nm), the design shifts to a color coordinate of $(x_0, y_0)=(0.399,0.382)$. When modulated by the extreme sinusoids, the color coordinates become $(x_1, y_1)=(0.407,0.374)$, and $(x_2, y_2)=(0.391,0.391)$. This gives a color shift of $\Delta_{xy}=0.012$ for both polarizer extremes, which is still fairly low. Note that if the retardation is shifted from a center wavelength of 532 nm to 537 nm, this shift can be greatly reduced to $\Delta_{xy}=0.004$, restoring the stability of the original design.

Maintaining optimum performance becomes more challenging when there are drastic changes in the SPD, even when the two sources are metamers. For example, the spectral structure associated with some sources (e.g. a fluorescent light) places much greater emphasis on certain wavelengths. And even though a fluorescent SPD can have the same white point as a featureless SPD, the sampling of the fluorescent SPD by the filter can produce a much different white point. In the event that a filter skews the white point (e.g. in an indoor environment) to an unacceptable level, the CE level can simply be dialed down to achieve an acceptable result. Products that are engineered according to the techniques described to work for a number of light sources can be realized. Alternatively, an active adjustment via (e.g.) a small shift in the sinusoid from a variable retardation, could make a single product address a particular range of lighting conditions. This was demonstrated in the previous example. The above discussion is also relevant to the SPD associated with a camera flash.

Figure 8:
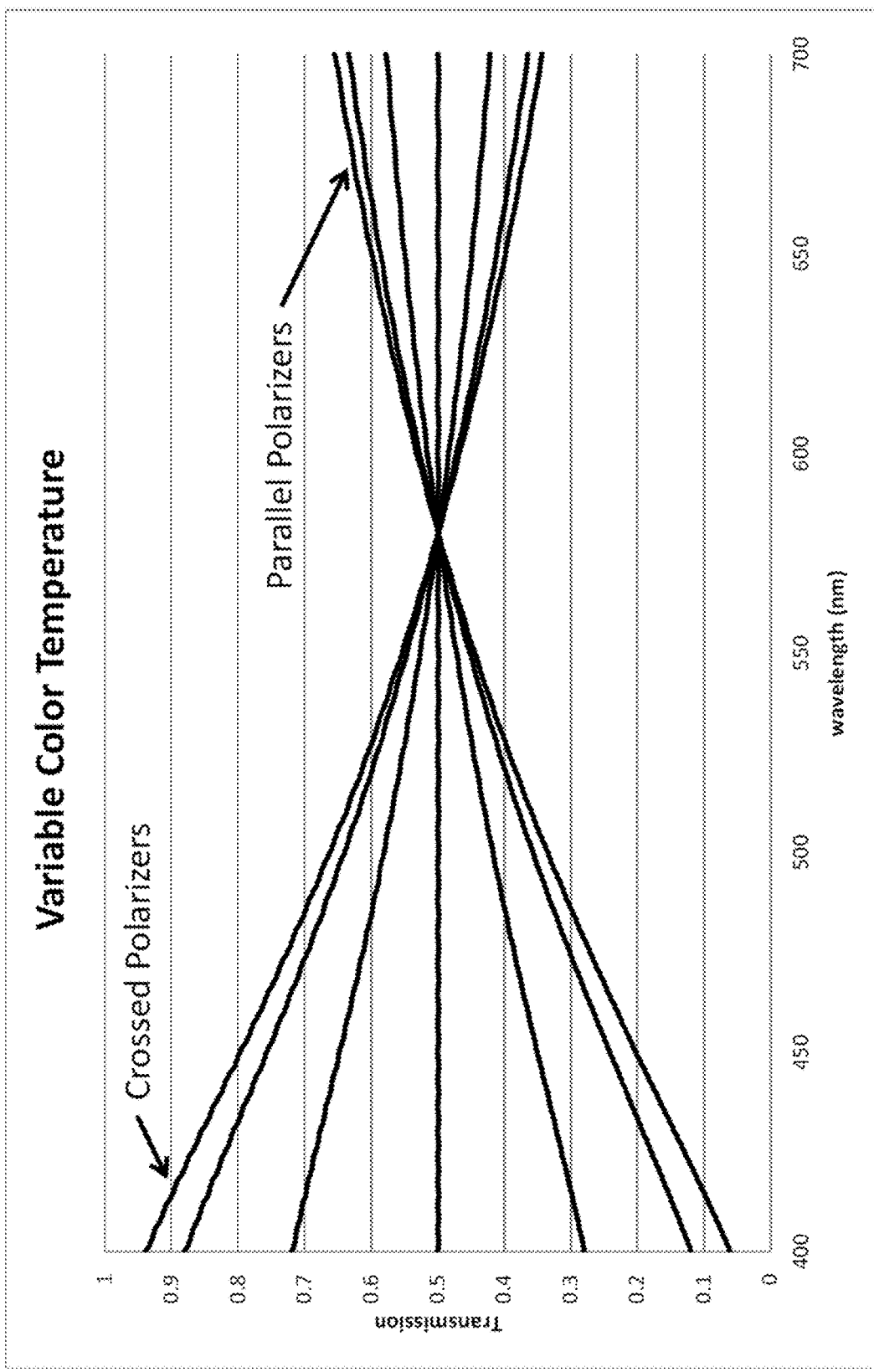
FIG. 8 shows the transmission for a variable color temperature filter.

The invention can also be used to create other tunable filters. A variable color balance filter can be created using the same structure as the CE filter. A characteristic of these filters is that the transmission remains stable under rotation of one polarizer for any wavelength corresponding to quarter-wave (QW) retardation. As such, the QW wavelength(s) is the pivot point in the spectral transmission as one polarizer is rotated. In general, the transmission is flat at 50% (25% for unpolarized input) when the polarizer is oriented at $\pi/4$. As before, this setting preserves the fidelity of the input. For this example a zero-order polycarbonate retardation of a quarter-wave at 580 nm (spectral yellow) is used as the pivot point. FIG. 8 shows the transmission function for several polarizer angles. As the polarizer is rotated the full $\pi/2$ angle-range, the output sweeps through a range of color-temperatures. The output lies substantially on the blackbody curve. And while the transmission efficiency is higher for higher color temperatures, it is largely offset by the fact that longer wavelength light is more lumen rich. The peak lumen transmission is 54% falling to 46% at the lowest color temperature.

The crossed-polarizer color coordinate is (0.286, 0.293), which is approximately 9000K. The parallel-polarizer color coordinate is (0.411, 0.402), which is approximately 3,400K. With these end-points, and the passing through the equal-energy white point, the transformation largely follows the blackbody curve. As before, the transmission function can be stabilized with incidence angle by using a compensation scheme, used techniques of the prior art (e.g. positive c-plate retarder combined with the quarter-wave retarder). The +c-plate is a positive uniaxial retarder with optic axis normal to the substrate, in this case with a retardation of about 70-100 nm. Compensation ensures that the color temperature is maintained even over large fields-of-view.

In the event that optical elements down-stream of the output polarizer exhibit polarization-sensitivity, an achromatic quarter-wave retarder can be laminated to the output side of the output polarizer. This allows the output polarizer to be rotated without modulating luminance or color of the captured/observed image. Circular polarizers can also be helpful in eliminating ghosts due to specular reflections down-stream of the quarter-wave retarder.

It should be understood that the teachings herein apply equally to any situation where a filter could be used. For example, the filter could be directly or indirectly illuminated by a light source or it could be receptive of light from an illuminated scene such as would be the case for a filter used in conjunction with an image capture device, with a human eye, or as used in most any other application.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

The invention claimed is:

1. A variable color enhancement filter, comprising:
   an input linear polarizer;
   a color enhancing polarization interference filter (PIF) including one or more wavelength dispersive retarders; and
   an output linear polarizer positioned so that light passing through the input polarizer and the PIF passes through the output polarizer, wherein the output polarizer is rotatable relative to the input polarizer;
   wherein the variable color enhancement filter has a transmission spectrum that varies depending on a rotational position of the output polarizer relative to the input polarizer, and the transmission spectrum generated when the output polarizer is in one rotation orientation includes full color enhancement (CE), with at least one peak in each of the red (600-670 nanometers), green (520-555 nanometers), and blue wavelengths (450-475 nanometers), and at least one minima in each of the cyan (475-520 nanometers) and yellow (555-600 nanometers) wavelengths of maximum modulation depth;
   wherein rotation of the output polarizer by $\pm\pi/4$ with respect to the one rotation orientation for full color enhancement gives a neutral transmission spectrum, where the transmission is the same across the visible spectrum; and
   wherein rotation of the output polarizer by $\pm\pi/2$ with respect to the one rotation orientation for full color enhancement gives full color suppression (CS), with at least one peak in each of the cyan and yellow wavelengths and at least one minima in each of the red, green and blue wavelengths of maximum modulation depth.

2. A filter as defined in claim 1, wherein the filtered color coordinate for a spectrally flat input in the CE, CS, and neutral states is equivalent.

3. A filter as defined in claim 2, wherein equivalent includes the filtered color coordinate in each state being within a just noticeable difference.

4. A filter as defined in claim 1, wherein the filtered luminance for a spectrally flat input in the CE, CS, and neutral states is equivalent.

5. A filter as defined in claim 1, wherein modulation of the output polarizer orientation produces two or more distinct color filtered versions of an input image.

6. A filter as defined in claim 1, wherein synchronous modulation of the output polarizer orientation with a field rate of an electronic image capture device produces two or more filtered versions of an input for each captured field.

7. A filter as defined in claim 1, further including a first mechanical tuning mechanism and a second mechanical tuning mechanism, wherein the first mechanical tuning mechanism rotates the two polarizers in unison, and wherein the second mechanical tuning mechanism rotates the output polarizer relative to the input polarizer.

8. A filter as defined in claim 7, wherein the filter is affixed to a digital SLR camera and the first and second mechanical tuning mechanisms are rings.

9. A filter as defined in claim 7, wherein the filter is affixed to a digital camera and the first and second mechanical tuning mechanisms are rings.

10. A filter as defined in claim 1, wherein the filter provides a variable color temperature.

11. A filter as defined in claim 1, wherein the light passing through the input polarizer comes from an illuminated scene and light passing through the filter is provided to an optical detection medium.

12. A filter as defined in claim 11, wherein the optical detection medium is a camera sensor array.

13. A filter as defined in claim 11, wherein the optical detection medium is a human eye.

14. A filter as defined in claim 11, wherein the light passing through the input polarizer is light with a particular spectral power distribution and the detection medium is a color sensitive detector.

* * * * *